(12) United States Patent
Munger et al.

(10) Patent No.: US 12,001,562 B2
(45) Date of Patent: Jun. 4, 2024

(54) IDENTIFICATION OF DEVICES IN UEFI SECURE BOOT DATABASES

(71) Applicant: Dell Products L.P., Round Rock, TX (US)

(72) Inventors: William C. Munger, Round Rock, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 17/869,840

(22) Filed: Jul. 21, 2022

(65) Prior Publication Data
US 2024/0028733 A1    Jan. 25, 2024

(51) Int. Cl.
*G06F 21/57* (2013.01)
(52) U.S. Cl.
CPC .......... *G06F 21/575* (2013.01); *G06F 21/572* (2013.01)

(58) Field of Classification Search
CPC ............................. G06F 21/575; G06F 21/572
See application file for complete search history.

(56) References Cited

U.S. PATENT DOCUMENTS

| | | |
|---|---|---|
| 2017/0098084 A1 | 4/2017 | Kulkarni et al. |
| 2018/0075242 A1 | 3/2018 | Khatri et al. |

*Primary Examiner* — Stefan Stoynov
(74) *Attorney, Agent, or Firm* — Larson Newman, LLP

(57) ABSTRACT

An information handling system includes a memory and a basic input/output system (BIOS). The memory stores a lookup table to associate each of a plurality of device firmware hashes with a corresponding one of a plurality of device identification strings. The BIOS calculates the each of the device firmware hashes. Each device firmware hash is associated with a different device firmware. The BIOS creates the lookup table based on the calculated device firmware hashes and the device identification strings. Based on the lookup table, the BIOS displays a secure boot allowed devices database list on a display device.

20 Claims, 4 Drawing Sheets

US 12,001,562 B2

IDENTIFICATION OF DEVICES IN UEFI SECURE BOOT DATABASES

FIELD OF THE DISCLOSURE

The present disclosure generally relates to information handling systems, and more particularly relates to identifying devices in UEFI boot databases.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a basic input/output system (BIOS). The memory may store a lookup table to associate each of a plurality of device firmware hashes with a corresponding one of a plurality of device identification strings. The BIOS may calculate each of the device firmware hashes. Each device firmware hash is associated with a different device firmware. The BIOS may create the lookup table based on the calculated device firmware hashes and the device identification strings. Based on the lookup table, the BIOS may display a secure boot allowed devices database list on a display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
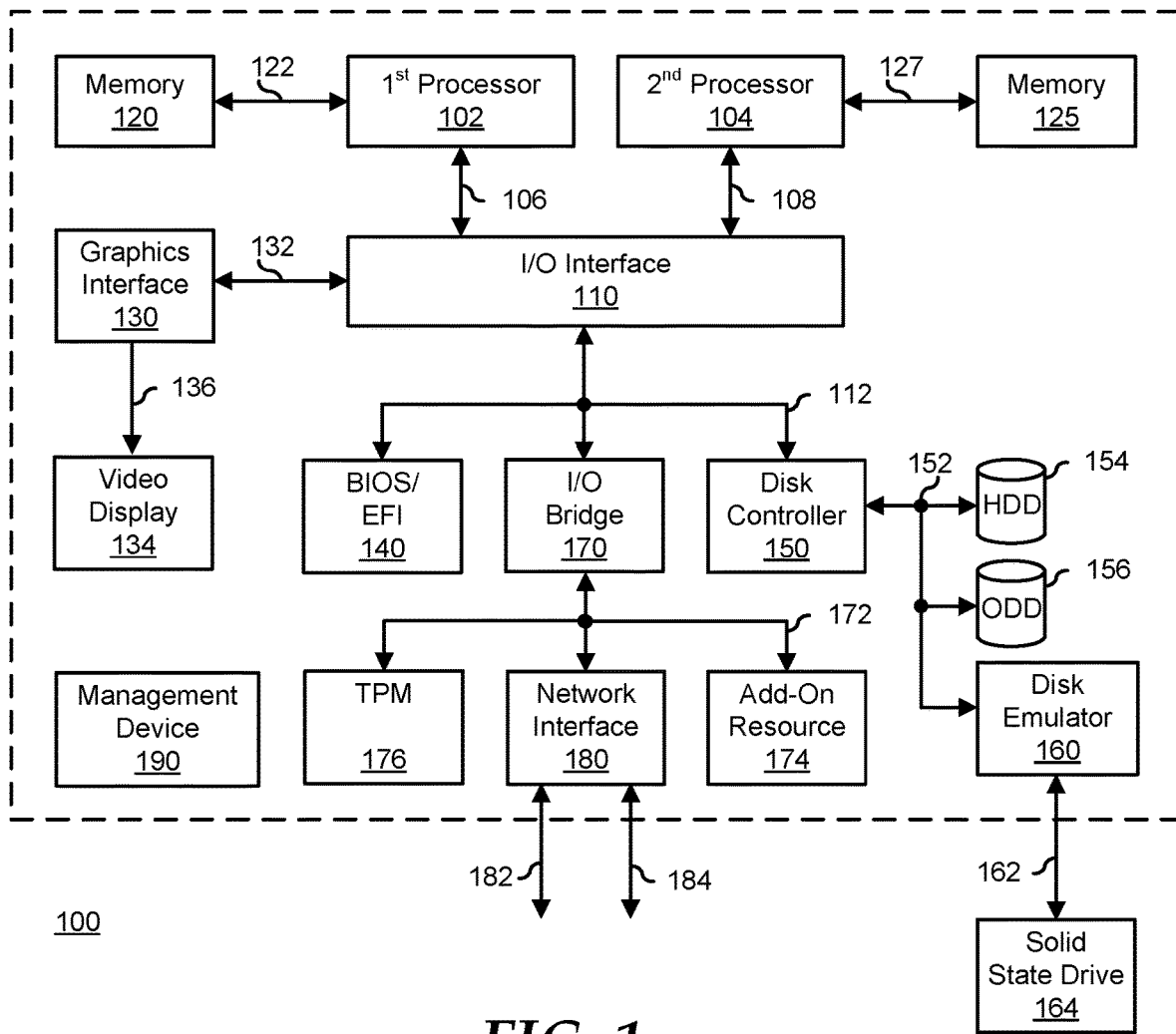
FIG. 1 is a block diagram of a general information handling system according to an embodiment of the present disclosure.

FIG. 1 shows a generalized embodiment of an information handling system 100 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below and operates to perform one or more of the methods described below. Information handling system 100 includes a processors 102 and 104, an input/output (I/O) interface 110, memories 120 and 125, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an I/O bridge 170, one or more add-on resources 174, a trusted platform module (TPM) 176, a network interface 180, a management device 190, and a power supply 195. Processors 102 and 104, I/O interface 110, memory 120, graphics interface 130, BIOS/UEFI module 140, disk controller 150, HDD 154, ODD 156, disk emulator 160, SSD 162, I/O bridge 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to I/O interface 110 via processor interface 106, and processor 104 is connected to the I/O interface via processor interface 108. Memory 120 is connected to processor 102 via a memory interface 122. Memory 125 is connected to processor 104 via a memory interface 127. Graphics interface 130 is connected to I/O interface 110 via a graphics interface 132 and provides a video display output 136 to a video display 134. In a particular embodiment, information handling system 100 includes separate memories that are dedicated to each of processors 102 and 104 via separate memory interfaces. An example of memories 120 and 125 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O bridge 170 are connected to I/O interface 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 3394 (Firewire) interface, a proprietary interface, or a combination thereof. Alternatively, solid-state drive 164 can be disposed within information handling system 100.

I/O bridge 170 includes a peripheral interface 172 that connects the I/O bridge to add-on resource 174, to TPM 176, and to network interface 180. Peripheral interface 172 can be the same type of interface as I/O channel 112 or can be a different type of interface. As such, I/O bridge 170 extends the capacity of I/O channel 112 when peripheral interface 172 and the I/O channel are of the same type, and the I/O bridge translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as I/O interface 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management device 190 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 100. In particular, management device 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management device 190 can include a network connection to an external management system, and the management device can communicate with the management system to report status information for information handling system 100, to receive BIOS/UEFI or system firmware updates, or to perform other task for managing and controlling the operation of information handling system 100.

Management device 190 can operate off of a separate power plane from the components of the host environment so that the management device receives power to manage information handling system 100 when the information handling system is otherwise shut down. An example of management device 190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 190 may further include associated memory devices, logic devices, security devices, or the like, as needed or desired.

Figure 2:
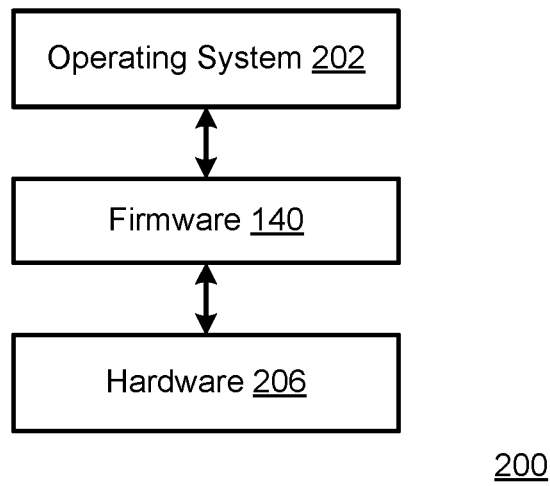
FIGS. 2 and 3 are block diagrams of examples of aspects of an extensible firmware interface (EFI) environment according to a specific embodiment of the present disclosure.

Referring now to FIG. 2, examples of aspects of an EFI environment created by BIOS/EFI firmware 140 of the information handling system are described. For example, BIOS/EFI firmware 140 includes firmware compatible with the EFI specification. The EFI specification describes an interface between OS 202 and BIOS/EFI firmware 140. Particularly, the EFI specification defines the interface that BIOS/EFI firmware 140 implements and the interface that OS 202 may use in booting. According to an implementation of EFI, both EFI and legacy BIOS support modules may be present in BIOS/EFI firmware 140. This allows the information handling system to support both firmware interfaces. Addition details regarding the architecture and operation of the EFI are provided below.

Figure 3:
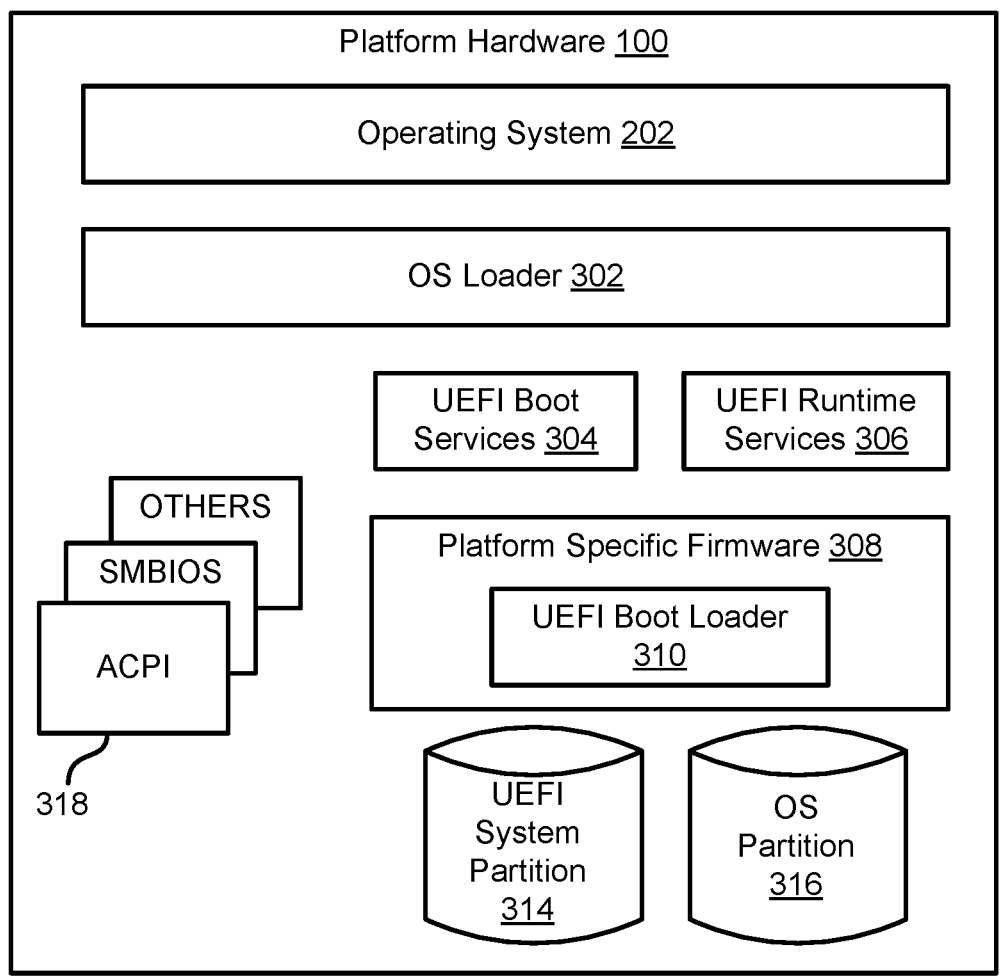

FIG. 3 shows a block diagram of a platform hardware 100 substantially similar to information handling system 100 of FIG. 1. Platform hardware 100 illustrates aspects of UEFI 140 of FIG. 1 and OS 202 of FIG. 2. Platform specific firmware 308 may retrieve OS program code from UEFI system partition 314 using OS loader 302, also known as a boot loader or OS boot loader. OS loader 302 may retrieve OS program code from other locations, including from attached peripherals or from firmware 140, itself. An OS partition 316 may also be present. Once started, OS loader 302 continues to boot OS 202. OS loader 302 may use UEFI boot services 304 to support other specifications 318. Examples of other supported specifications 318 include advanced configuration and power management interface (ACPI), system management BIOS (SMBIOS), and the like. UEFI boot services 304 may provide interfaces for devices and system functionality that can be used during boot time. UEFI runtime services 306 may be available to OS loader 302 during the boot phase and to OS 202 when running. For example, runtime services 306 may be present to ensure appropriate abstraction of base platform hardware resources that may be needed by OS 202 during normal operation.

UEFI allows extension of platform firmware by loading UEFI drivers and UEFI application images which, when loaded, have access to UEFI runtime and boot services 304. Various program modules provide the boot and runtime services. These program modules may be loaded by boot loader 310 at system boot time. EFI boot loader 310 is a component in the UEFI firmware that determines which program modules should be explicitly loaded and when. Once the UEFI firmware is initialized, it passes control to boot loader 310. Boot loader 310 may be then responsible for determining which program modules to load and in which order.

UEFI images can include UEFI drivers, applications, and boot loaders, and are a class of files defined by UEFI that contain executable code. UEFI boot loader 310 and a boot manager in particular, is a firmware policy engine that is in charge of loading the operating system loader and all necessary drivers. UEFI applications can be loaded by the boot manager or by other UEFI applications to accomplish platform specific tasks within the boot services environment. A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol includes a globally unique identifier (GUID), which is a 128-bit value used to differentiate services and structures in the boot services environment.

The UEFI boot flow can be divided into a sequence of phases, including a pre-EFI initialization (PEI) phase, followed by a driver execution environment (DXE) phase, a boot device selection (BDS) phase, and a run time (RT) phase. The UEFI boot sequence can include additional phases, and one or more phases can be subdivided into two or more sub-phases. For clarity and brevity, details of these phases will not be described except to describe aspects of the present disclosure. The DXE phase is where most of the system initialization is performed. Pre-EFI Initialization (PEI), the phase prior to DXE, is responsible for initializing permanent memory in the platform so that the DXE phase can be loaded and executed. There are several components in the DXE phase, including a DXE foundation, DXE dispatcher, and a set of DXE drivers.

In order to support platform specific security policies for DXE driver execution, the DXE dispatcher is required by the UEFI specification to use the services of the security architecture protocol (SAP) every time a firmware volume is discovered and every time a DXE driver is loaded. In an example, the proprietary authentication policy can extract an authentication signature from a firmware volume and attempt to validate the signature using an OEM authentication procedure, such as RSA encryption, a hashing algorithm, or the like. In another example, if the extracted authentication signature is not recognized as an original equipment manufacturer (OEM) signature, the authentication policy may attempt to authenticate the extracted signature using a Secure Boot procedure provided by the UEFI specification.

Secure Boot provides a mechanism for authenticating drivers and loaders that can be installed during boot initialization of information handling system 100. The Secure Boot protocol provided by the UEFI specification is configured to prevent the loading of UEFI drivers and operating system (OS) loaders that are not signed with an acceptable digital signature. Secure Boot does this by maintaining databases of software signers and software images that are pre-approved to run on a computer, such as a host server. In particular, the Secure Boot protocol defines an allowed list database (DB) for image hashes of UEFI applications, software loaders, and UEFI device drivers that can be loaded on the computer during an initialization or boot procedure. For example, the DB database can store a public key certificate authorizing execution of an operating system loader, such as the Microsoft Boot Manager. The Secure Boot protocol also defines a revoked or deny database (DBX) for storing images that are no longer trusted and may not be loaded during a boot procedure. For example, a Secure Boot compliant BIOS is configured to execute a signed device driver only if the driver is identified in the DB database, and will refuse to execute the driver if the driver is identified in the DBX database. The Secure Boot protocol further defines a Platform Key (PK) and a Key Exchange Key (KEK) database. As used herein, the term Secure Boot protocol refers to operational features and requirements defined by the UEFI Secure Boot specification, and should not be confused with a UEFI protocol, which refers to a software interface used for communication between two binary modules.

Databases DB, DBX, PK, and KEK may be stored as authenticated UEFI non-volatile variables in the BIOS flash memory. For example, an OEM may store allowed list database, revoked or deny list database, and KEK signature database on the firmware nonvolatile random access memory (NVRAM) at manufacturing time. After firmware validation and testing, the OEM can lock the firmware and generates a Platform Key. PK may be used to sign updates to KEK or to turn off Secure Boot. During power-on-self-test (POST), a LoadImage( ) function loads a UEFI image (UEFI executable) into memory and returns a handle to the image. When the UEFI Loadimage( ) function is called, Secure Boot authentication check code can be invoked to make sure the image is from a trusted source, for example the driver's digital signature is verified by a certificate included in the allowed list database and is not included in the revoked or deny list database. Secure Boot may include two operating policies in BIOS Setup Options, Standard Policy and Custom Policy. In the Standard policy, the keys are pre-provisioned in the BIOS, for example by an OEM. Keys and certificates can only be added or deleted by signing the contents by previously trusted keys that are programmed in the BIOS, or by updating BIOS firmware that contains different keys. In the Custom policy more flexibility is added to allow a physically present user to modify the contents of the Secure Boot signature databases, the user can even turn off Secure Boot by deleting PK.

Figure 4:
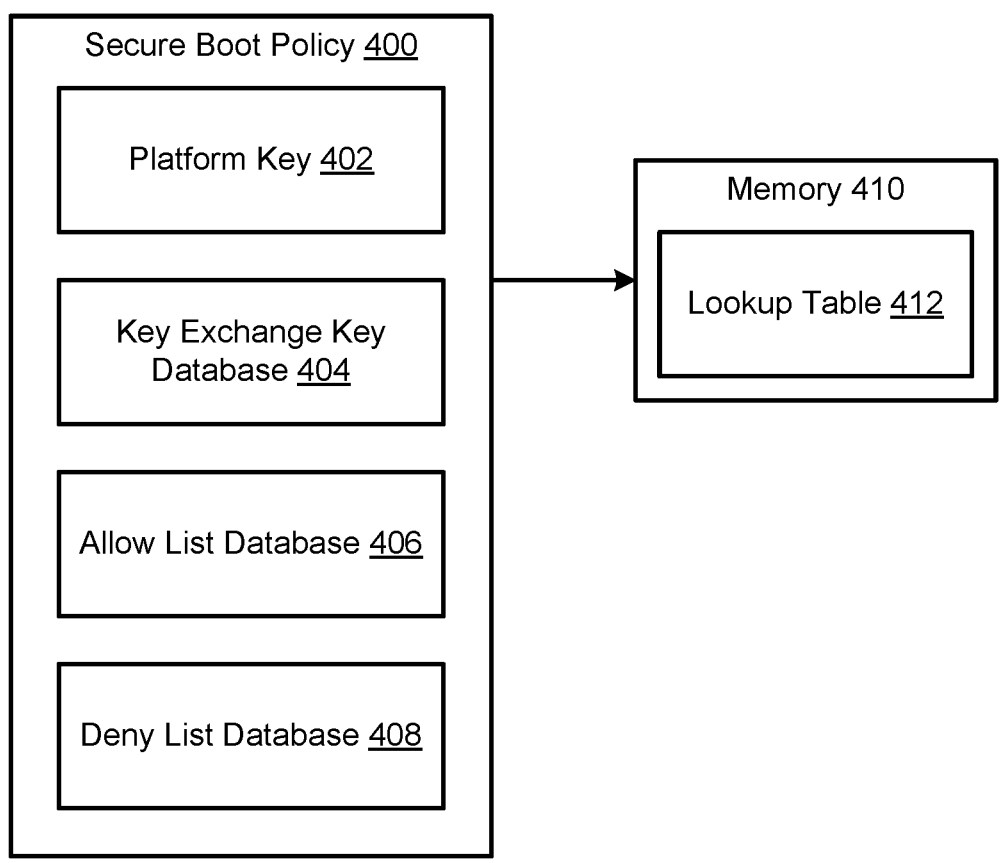
FIG. 4 is a block diagram of an example of a secure boot policy according to a specific embodiment of the present disclosure.

To better illustrate the foregoing, FIG. 4 is a block diagram of an example of Secure Boot policy 400. As illustrated, Secure Boot policy 400 includes platform key (PK) 402, Key Exchange Key (KEK) database 404, an allow list database (db) 406, and revoked or deny list database (dbx) 408. In an example, secure boot 400 may operate in any of four different modes, such as setup mode, user mode, audit mode, and deployed mode. In an example, Secure Boot policy 400 is usable by BIOS/EFI firmware 140 of information handling system 100 in FIG. 1 to determine whether or not to load one or more pre-boot code modules, for example, during a DXE phase of a booting process. As used herein, the term "pre-boot code module" refers to any Unified EFI (UEFI) image that begins executing before the ExitBootServices( ) operation completes. Examples of pre-boot code modules include, but are not limited to, device I/O firmware and OS boot loaders. In many situations, the user may not have access to the image of the driver, firmware, or boot loader.

In some cases, allow list database 406 may store a public key certificate authorizing execution of an OS loader, such as a Windows program compatibility assistant (PCA), option ROMs of a particular device, or the like. Revoked or deny list database 408 may be used for storing keys, certificates, or hashes for images that are no longer trusted and may not be loaded during a boot procedure. For example, a Secure Boot compliant BIOS is configured to execute a signed device driver only if the driver is identified in allow list database 406, and will refuse to execute the driver if the driver is identified in deny list database 408. The Secure Boot policy further defines PK 402, which can be used to verify updates to KEK 402. In some embodiments, KEK 404 may be a separate database of signing keys that can be used to verify updates to allow list database 406 and deny list database 408.

Databases PK 402, KEK 404, allow list database 406, and deny list database 408 may be stored as authenticated UEFI non-volatile variables in a flash memory. For example, an original equipment manufacturer (OEM) can store PK 402, KEK 404, allow list database 406, and deny list database 408 on the firmware nonvolatile random access memory (NVRAM) at manufacturing time.

In previous information handling systems, the hash values in allow list database 406 and deny list database 408 may not be associated or mapped to device names. In these previous information handling systems, a user or individual associated with the information handling system may be provided, via graphical user interface (GUI) on a display device, allow list database 406 and deny list database 408. However, in these previous information handling systems, the display of allow list database 406 and deny list database 408 may only include the hash values, and as a result, the individual associated with information handling system may not be able to identify the allowed and denied devices. Information handling system 100 of FIG. 1 may be improved by BIOS 140 creating, and storing in a volatile memory 410, a lookup table 412 linking or mapping the hash values to a user friendly or unique device identification string. Information handling system 100 may be further improved by tools within secure boot 400 utilizing lookup table 412 to display both the hash values and the unique device identification string for each device in allow list database 406 and deny list database 408.

During the system boot, BIOS 140 may perform multiple operations, such as those described above and device discovery operations. These device discovery operations may be any suitable operations including, but not limited to, calculating a hash value for each device firmware the BIOS attempts to load, and discovering information for the devices including the unique device identification string. After these operations are performed, BIOS 140 may create lookup table 412 to link the device firmware hash with its corresponding unique device identification string. An exemplary lookup table 412 is provided in table 1 below:

TABLE 1

| Device ID String | Hash of Firmware | Serial Number | Other Info |
|---|---|---|---|
| NIC in slot 1 | 0x78EE9C . . . | 1245AD864F | . . . |
| NIC in slot 2 | 0x5492AF . . . | 7E56FR847G | . . . |
| Embedded SAS controller | 0x93ED49 . . . | 9561HL5G8P | . . . |
| NIC in slot 3 | 0xA95278 . . . | 8167YK6985 | . . . |

As illustrated in Table 1 above, a first device may have a unique identification string of 'NIC in slot 1' and the corresponding hash of the device firmware may be '0x78EE9C . . . ". In response to lookup table 412 being created, BIOS 140 may store the lookup table in volatile memory 410. BIOS 140 may also send lookup table 412 to BMC 190 of FIG. 1. BMC 190 may store lookup table 412 in a memory associated with the BMC.

BIOS 140 may include one or more tools to provide, via display device 134 of FIG. 1, data to an individual associated with information handling system 100 during the system boot. For example, the tools may include, but are not limited to, a BIOS setup utility, and consoles of BMC 190. In an example, the information may include any suitable data, such as allow list database 406 and deny list database 408. In certain examples, allow list database 406 may include any suitable number of devices. For clarity and brevity, only two exemplary allow devices will be listed for allow list database 406. For example, allow list database 406 may include: Certificate: 'Windows PCA'; Hash: 0x5492AF . . . and the device identification string "NIC in slot 2"; and Hash: 0x93ED49 . . . and the device identification string "Embedded SAS Controller". In certain examples, deny list database 408 may include any suitable number of devices. For clarity and brevity, only two exemplary deny devices will be listed for deny list database 408. For example, deny list database 408 may include: Hash: 0x78EE9C . . . and "NIC in slot 1"; and Hash: 0xA95278 . . . and "NIC in slot 3".

Based on the firmware hashes and corresponding unique device identification strings, an individual associated with information handling system 100 may easily determine that NIC in slot 2 and the embedded SAS controller are both allowed. The individual may also determine that NIC in slot 1 and NIC in slot 3 are both denied. Based on the information or data from allow list database 406 and deny list database 408 being provided along with the unique device identification strings from lookup table 412, the individual may be able to identify what devices, if any, need to be updated or replaced.

Based on memory 410 being a volatile memory, lookup table 412 may be erased during a shutdown or reset of information handling system 100. During the next system boot, BIOS 140 may perform substantially similar operations as those described above to create lookup table 412, store the lookup table in memory 410, and send the lookup table to BMC 190 of FIG. 1. In an example, the removal of lookup table 412 from memory 410 during every shutdown may enable the lookup table to remain accurate and up-to-date. For example, if NIC in slot 2 is moved to slot 4, during the next system boot lookup table 412 would include the unique device identification string 'NIC in slot 4' with the firmware hash '0x5492AF . . . '. As shown in Table 1 above, previous lookup table 412 included the firmware hash '0x5492AF . . . ' with the unique device identification string 'NIC in slot 2'. Thus, BIOS 140 may create an accurate lookup table 412 during each system boot.

In an example, memory 410 may be a non-volatile memory, such that lookup table 412 is not erased during a shutdown or reset of information handling system 100. In this example, after the device discovery, BIOS 140 may compare the firmware hash values calculated during a current system boot with hashes in lookup table 412 stored in non-volatile memory 410. BIOS 140 may determine a delta or change in firmware hash values and corresponding unique device identification strings. Using the example above, if NIC in slot 2 is moved to slot 3, BIOS 140 will replace the entry 'Hash: 0x5492AF . . . and 'NIC in slot 2' in lookup table 412 with an entry 'Hash: 0x5492AF . . . and 'NIC in slot 4'. In this example, allowed list database 406 for a current boot may include 'Hash: 0x5492AF . . . and 'NIC in slot 4'. If a particular firmware hash value in lookup table 412 is not created or calculated during a current system boot, BIOS 140 may remove the entry associated with that firmware hash value and the corresponding unique device identification string from lookup table 412.

As described herein, information handling system 100 may be improved by BIOS 140 creating lookup table 412 and storing the lookup table in a volatile memory, such as memory 410, regardless of a secure boot 400 mode. In an example, the secure BIOS mode 400 capable of creating and storing lookup table 412 may include, but is not limited to, setup mode, user mode, audit mode, and deployed mode. Based on lookup table 412, configuration utility of BIOS 140, such as BIOS setup, may display hash-to-device mapping so that an individual may identify devices affected by the secure boot allow list database 406 and deny list database 408. In an example, BIOS 140 may send the data of lookup table 412 to BMC 190 so that system management tools may also display the hash-to-device mapping.

Figure 5:
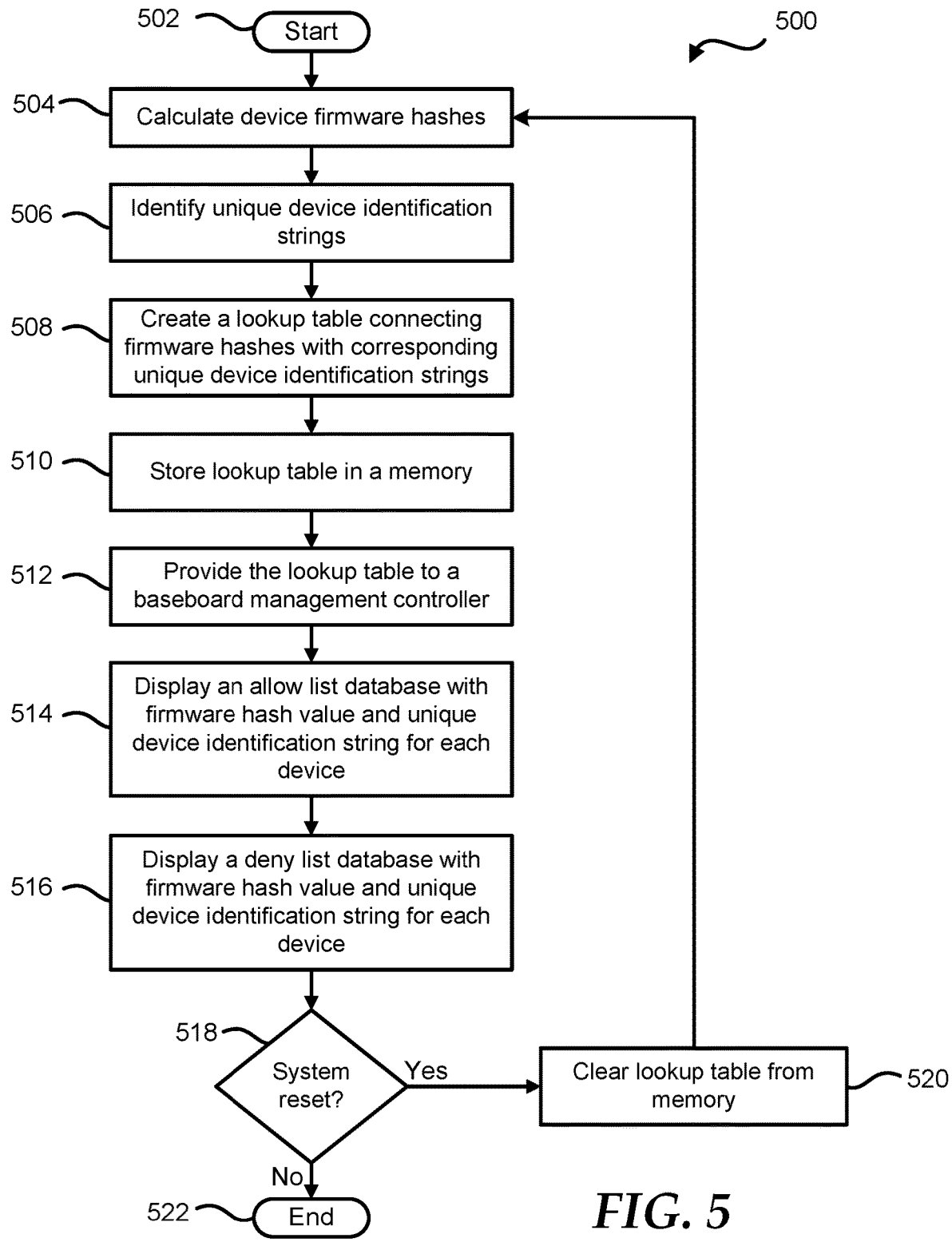
FIG. 5 is a flow diagram of a method for identifying devices in unified extensible firmware interface (UEFI) boot databases according to at least one embodiment of the present disclosure.

FIG. 5 shows a method 500 for identifying devices in Unified Extensible Firmware Interface (UEFI) boot databases according to at least one embodiment of the present disclosure, starting at block 502. In an example, the method 500 may be performed by any suitable component including, but not limited to, a processor, such as processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 504, device firmware hashes are calculated. In an example, a different hash value is created for the firmware of each different device. The firmware may be for a device that a BIOS attempts to load. At block 506, a different unique device identification string is identified for each different device within the information handling system. At block 508, a lookup table is created. In an example, the lookup table may link a device firmware hash with its corresponding unique device identification string. In an example, a first device in the lookup table may have a unique identification string of 'NIC in slot 1' and the corresponding hash of the device firmware may be '0x78EE9C . . . "

At block 510, the lookup table is stored in a memory. In an example, the memory may be a volatile memory. In another example, the memory may be a non-volatile memory. At block 512, the lookup table is provided to a BMC of the information handling system. At block 514, an allow list database is displayed to an individual associated with the information handling system. In an example, the allow list database may be provided on a display device of the information handling system. In certain examples, the allow list database may include both the firmware hash value and the unique device identification string for each device in the allow list database. For example, the allow list database may include any suitable number of devices. For clarity and brevity, only two exemplary allow devices will be listed for the allow list database. For example, the allow list database may include: Certificate: 'Windows PCA'; Hash: 0x5492AF . . . and "NIC in slot 2"; and Hash: 0x93ED49 . . . and "Embedded SAS Controller".

At block 516, a deny list is displayed to an individual associated with the information handling system. In certain examples, the deny list database may include both the firmware hash value and the unique device identification string for each device in the deny list database. For example, the deny list database may include any suitable number of devices. For clarity and brevity, only two exemplary deny devices will be provided for the deny list database. For example, the deny list database may include: Hash: 0x78EE9C . . . and "NIC in slot 1"; and Hash: and "NIC in slot 3".

At block 518, a determination is made whether a system reset has occurred. If a system reset has occurred, the lookup table is cleared from the volatile memory at block 520, and the flow continues as stated above at block 504 during a subsequent system boot. If a system reset has not occurred, the flow ends at block 522.

Those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
    a memory to store a lookup table to associate each of a plurality of device firmware hashes with a corresponding one of a plurality of device identification strings; and
    a basic input/output system (BIOS), during a first boot of the information handling system, the BIOS to:
        calculate each of the device firmware hashes, wherein each device firmware hash is associated with a different device firmware;
        create the lookup table based on the calculated device firmware hashes and the device identification strings; and
        based on the lookup table, display a secure boot allowed devices database list on a display device, wherein the secure boot allowed devices database list includes both a first device firmware hash and a first device identification string for a first device.

2. The information handling system of claim 1, further comprising a baseboard management controller to receive the lookup table from the BIOS, wherein the baseboard management controller to provide the first device firmware hash and the first device identification string for a first device.

3. The information handling system of claim 1, wherein the memory is a pre-boot volatile memory.

4. The information handling system of claim 3, wherein the lookup table is erased from the memory during a shutdown of the information handling system.

5. The information handling system of claim 4, wherein during a subsequent system boot, the BIOS to:
    re-calculate the each of the device firmware hashes, wherein each device firmware hash is associated with a different device firmware currently installed within the information handling system;
    create the lookup table based on the calculated each of the device firmware hashes and the device identification strings; and
    based on the lookup table, display a current secure boot allowed devices database list on the display device, wherein the current secure boot allowed devices database list includes both a second device firmware hash and a second device identification string for the first device.

6. The information handling system of claim 5, wherein the second device was installed in the information handling system after the first boot of the information handling system.

7. The information handling system of claim 1, wherein the memory is a non-volatile memory.

8. The information handling system of claim 7, wherein during a subsequent system boot, the BIOS to:
    re-calculate each of the device firmware hashes, wherein each device firmware hash is associated with a different device firmware currently installed within the information handling system;
    compare each of the re-calculated device firmware hashes to the device firmware hashes in the lookup table;
    remove device firmware hashes in the lookup table that do not match one of the re-calculated device firmware hashes; and
    add one or more of the re-calculate device firmware hashes to the lookup table that do not match one of the device firmware hashes currently in the lookup table.

9. A method comprising:
    calculating, by a basic input/output system (BIOS) of an information handling system, device firmware hashes, wherein each device firmware hash is associated with a different device firmware;
    creating, by the BIOS, a lookup table based on the device firmware hashes and the device identification strings;
    storing the lookup table in a memory; and
    based on the lookup table, displaying a secure boot allowed devices database list on a display device, wherein the secure boot allowed devices database list includes both a first device firmware hash and a first device identification string for a first device.

10. The method of claim 9, further comprising providing, by the BIOS, the lookup table to a baseboard management device of the information handling system.

11. The method of claim 9, wherein the memory is a pre-boot volatile memory.

12. The method of claim 11, wherein the lookup table is erased from the memory during a shutdown of the information handling system.

13. The method of claim 12, wherein during a subsequent system boot, the method further comprising:
    re-calculating, by the BIOS, the each of the device firmware hashes, wherein each device firmware hash is associated with a different device firmware currently installed within the information handling system;
    creating the lookup table based on the calculated each of the device firmware hashes and the device identification strings; and
    based on the lookup table, displaying a current secure boot allowed devices database list on the display device, wherein the current secure boot allowed devices database list includes both a second device firmware hash and a second device identification string for the first device.

14. The method of claim 13, wherein the second device was installed in the information handling system after the first boot of the information handling system.

15. The method of claim 9, wherein the memory is a non-volatile memory.

16. The method of claim 15, wherein during a subsequent system boot, the method further comprising:
    re-calculating the each of the device firmware hashes, wherein each device firmware hash is associated with a different device firmware currently installed within the information handling system;
    comparing each of the re-calculate device firmware hashes to the device firmware hashes in the lookup table;
    removing device firmware hashes in the lookup table that do not match one of the re-calculated device firmware hashes; and adding one or more of the re-calculate device firmware hashes to the lookup table that do not match one of the device firmware hashes currently in the lookup table.

17. An information handling system comprising:
a memory to store a lookup table to associate each of a plurality of device firmware hashes with a corresponding one of a plurality of device identification strings; and
a basic input/output system (BIOS), during a first boot of the information handling system, the BIOS to:
calculate each of the device firmware hashes, wherein each device firmware hash is associated with a different device firmware;
create the lookup table based on the device firmware hashes and the device identification strings;
based on the lookup table, display a secure boot allowed devices database list on a display device, wherein the secure boot allowed devices database list includes both a first device firmware hash and a first device identification string for a first device; and
based on the lookup table, display a secure boot deny devices database list on the display device, wherein the secure boot deny devices database list includes both a second device firmware hash and a second device identification string for a second device.

18. The information handling system of claim 17, wherein the memory is a pre-boot volatile memory.

19. The information handling system of claim 18, wherein the lookup table is erased from the memory during a shutdown of the information handling system.

20. The information handling system of claim 19, wherein during a subsequent system boot, the BIOS to:
re-calculate the each of the device firmware hashes, wherein each device firmware hash is associated with a different device firmware currently installed within the information handling system;
create the lookup table based on the calculated each of the device firmware hashes and the device identification strings; and
based on the lookup table, display a current secure boot allowed devices database list on the display device, wherein the current secure boot allowed devices database list includes both a second device firmware hash and a second device identification string for the first device.

* * * * *